United States Patent [19]
Lobel

[11] 3,857,254
[45] Dec. 31, 1974

[54] MEAT TREATING APPLIANCE

[76] Inventor: Stanley Lobel, 1096 Madison Ave., New York, N.Y. 10028

[22] Filed: July 23, 1973

[21] Appl. No.: 381,689

Related U.S. Application Data

[63] Continuation-in-part of Ser. No. 208,164, Dec. 15, 1971, Pat. No. 3,821,454.

[52] U.S. Cl. .................. 62/373, 62/272, 62/94, 62/93, 62/271, 62/64, 62/419, 426/524
[51] Int. Cl. ............................................. F25d 17/02
[58] Field of Search .......... 426/524; 62/94, 271, 93, 62/64, 373, 419

[56] References Cited
UNITED STATES PATENTS

| | | | |
|---|---|---|---|
| 2,560,057 | 7/1951 | Williams | 62/271 |
| 2,680,355 | 6/1954 | Colomb | 62/271 |
| 2,730,871 | 1/1956 | MacLean | 62/419 |

Primary Examiner—William J. Wye
Attorney, Agent, or Firm—Charles E. Temko

[57] ABSTRACT

The appliance comprises means to support the meat in a housing which directs the flow of air, means to dry the flow of air, means to force the flow of air about the meat, and in a modification, means to marinate the meat.

1 Claim, 4 Drawing Figures

MEAT TREATING APPLIANCE

The present application is a continuation in part of my co-pending application Ser. No. 208,164, filed Dec. 15, 1971, now U.S. Pat. No. 3,821,454.

This invention relates generally to the ageing of meat, and more particularly to improvements thereof.

It is well known that the ageing of meats has the effect of causing the meat to become more tender and to improve the flavor thereof. The meat is hung, usually as a carcass, in a refrigerated atmosphere for weeks. This protracted procedure results in considerable loss of weight. Since the ageing is normally done on the most expensive cuts of meat, the economic loss is all the greater. Furthermore the ageing ties up inventory and capital and requires considerable space.

By the use of my new appliance the meat may be rapidly aged by subjecting the same to a rapidly moving flow of air so that I obtain a degree of ageing in from 24 to 72 hours that now requires several weeks.

It is therefore among the objects of the present invention to provide novel and highly useful apparatus for performing my methods which takes the form of simple appliances which may be used by unskilled persons, and which are relatively low in cost so that they may have a consequent wide distribution and use.

These objects and other incidental ends and advantages will more fully appear in the progress of this disclosure and be pointed out in the appended claims.

Figure 1:
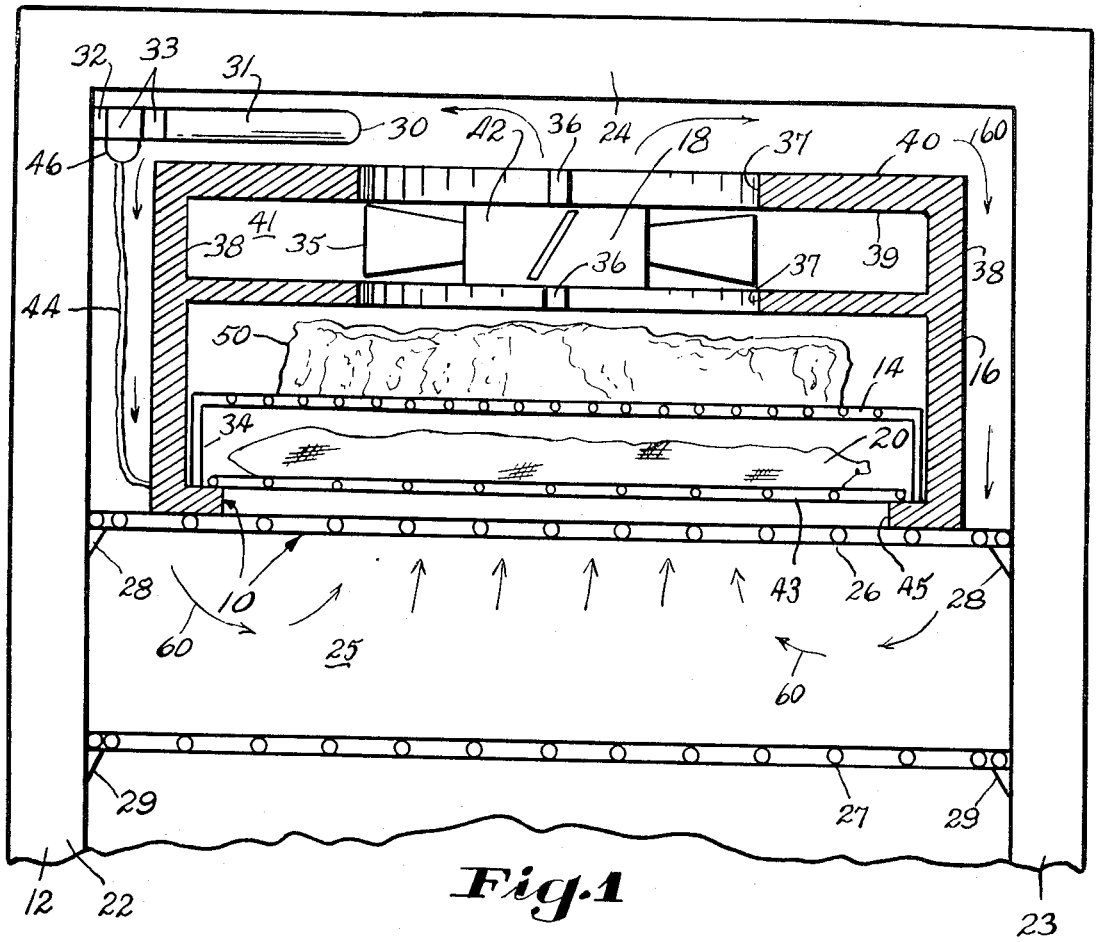
FIG. 1 is a fragmentary front elevational view, partly in section, showing an embodiment of the invention.

In accordance with the invention, the appliance in the first embodiment is generally indicated by reference character 10 and comprises generally a means 12 for supplying refrigerated air; a meat supporting element 14; a casing or housing 16; air moving means 18; and air drying means 20.

The means 12 may be a well known electric (or ice cooled), similar refrigerator. As shown a front door (not shown) has been opened to disclose the interior. Seen are side walls 22 and 23, top wall 24, rear wall 25, shelves 26 and 27, and shelf supports 28 and 29. The refrigerator may be normal and usual in all respects, the refrigerating mechanism per se not being shown. The refrigerator may have an interior source of illumination 30, including an incandescent bulb 31 and a socket 32. An adapter 33 enables the unit 40 to tap off electric energy for the fan 42. In the absence of an interior light in the refrigerator the cord 44 may be brought out through the space between the refrigerator door and the cabinet (pressed by the door gasket, not shown) to a suitable electrical outlet.

The meat supporting element 14 is in the form of a wire grid or similar foraminous material so that it will properly support the meat 50 in a substantially unobstructed manner in the path of the air flow 60 to provide maximum exposure of the meat to the air current. The element 14 may be suitably positioned by the legs 34.

The casing or housing 16 is preferably of rectangular shape, with sidewalls 38, top wall 39, and rear wall 41. Housing 16 has an open bottom so that the air flow has an unimpeded entrance. Housing 16 preferably has a front wall and door (not shown in FIG. 1) but like that shown in FIG. 2.

Disposed above the meat 50 is the means 18 which is shown in the form of an electrically driven fan 35 which is carried by struts 36 extending from the borders of the aligned orifices 37 in top and intermediate horizontal walls of housing 16. The motor of fan 35 is connected to the cord 44 by circuitry not shown.

The air drying means 20 is preferably in the form of a porous bag containing silica gel or similar moisture absorbing substances. The bag is supported on a rack 43 carried by inwardly directed ledges 45 projecting from the opposed inner surfaces of walls 38. When the silica gel becomes saturated with mositure, it may be replaced, or dried out in a well known manner, such as placing in an oven, and replaced.

In use, meat 50 is placed on supporting element 14, the means 20 is placed on rack 43, the refrigeration and hence air flow is maintained at a temperature just above freezing and up to 40° Fahrenheit, and the electric current connected to the fan 35. The dehydrated air flow is forced and is preferably maintained at a relative humidity as low as practicable, preferably ranging between 0 percent and 50 percent. The lower the humidity the quicker a skin-like layer is formed on the surface of the meat 50. The greater the quantity and/or velocity of the air flow 60 the quicker the skin-like layer is formed and the air flow may range from 5 cubic feet per minute to 60 cubic feet per minute. This dry skin retards loss of moisture from the body of the meat, but it also prevents the formation of mold on the surface of the meat. The ageing process is continued until the meat is properly aged, for a period ranging between 24 and 72 hours.

Figure 2:
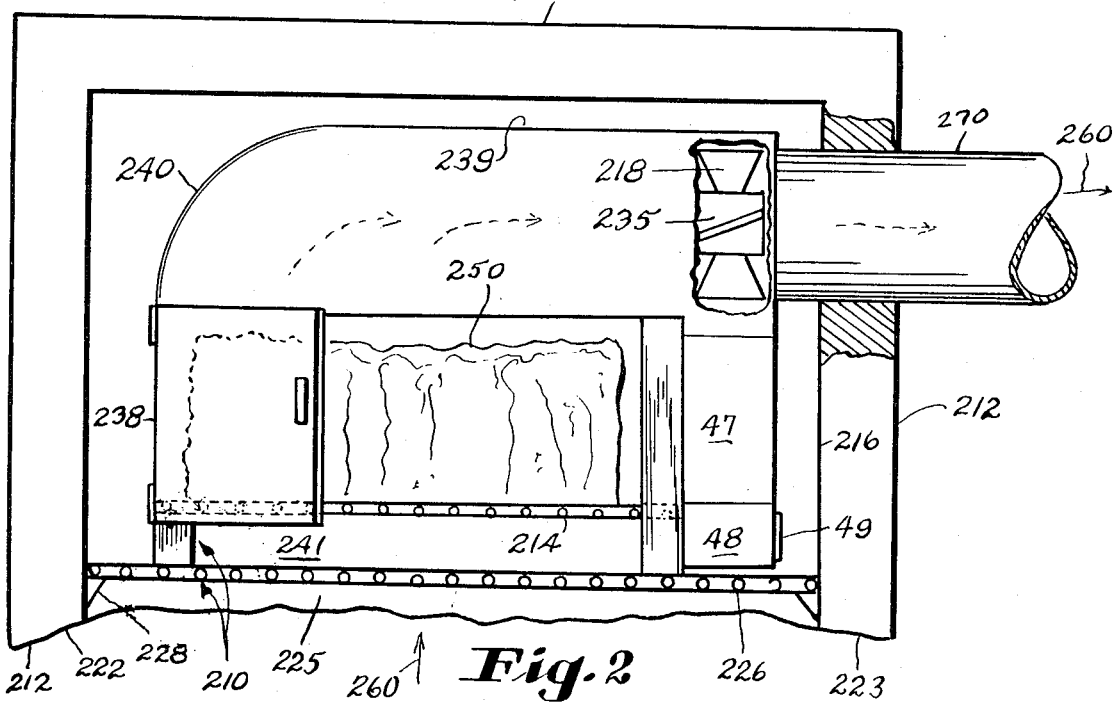
FIG. 2 is a fragmentary front elevational view showing second embodiment.

Turning to the second embodiment of the invention shown in FIG. 2, for the purpose of avoiding needless repetition, certain of the parts corresponding to those of the first embodiment are given the same reference characters with the addition of the prefix "2".

The second embodiment differs form the first embodiment principally in the following respects.

The means 20 is omitted, relying on the relatively lower humidity of the refrigerated air 260. As contrasted with the first embodiment, this appliance take more time.

The upper portion of the casing 216 forms a plenum from which the fan, which rotates about a horizontal axis, exhausts the air 260 containing moisture from the meat 250 outside of the means 212 through the duct 270.

In the second embodiment, the fan 235 is energized by a battery 47 which may be reenergized by the charger 48 with power cord (not shown) which is connectible with the receptacle 49.

It should be noted that the present appliances function very well as meat defrosters. Thus when a frozen pile of meat is substituted for the meat 50 since the temperature of the air flow is maintained at a temperature just above freezing and up to 40° Fahrenheit, as described above, the air flow produces a quicker thawing of the frozen meat. Furthermore, the surface frost as well as the excess moisture contact of the meat is picked up by the air flow as it oozes out of the meat during defrosting.

Figure 3:
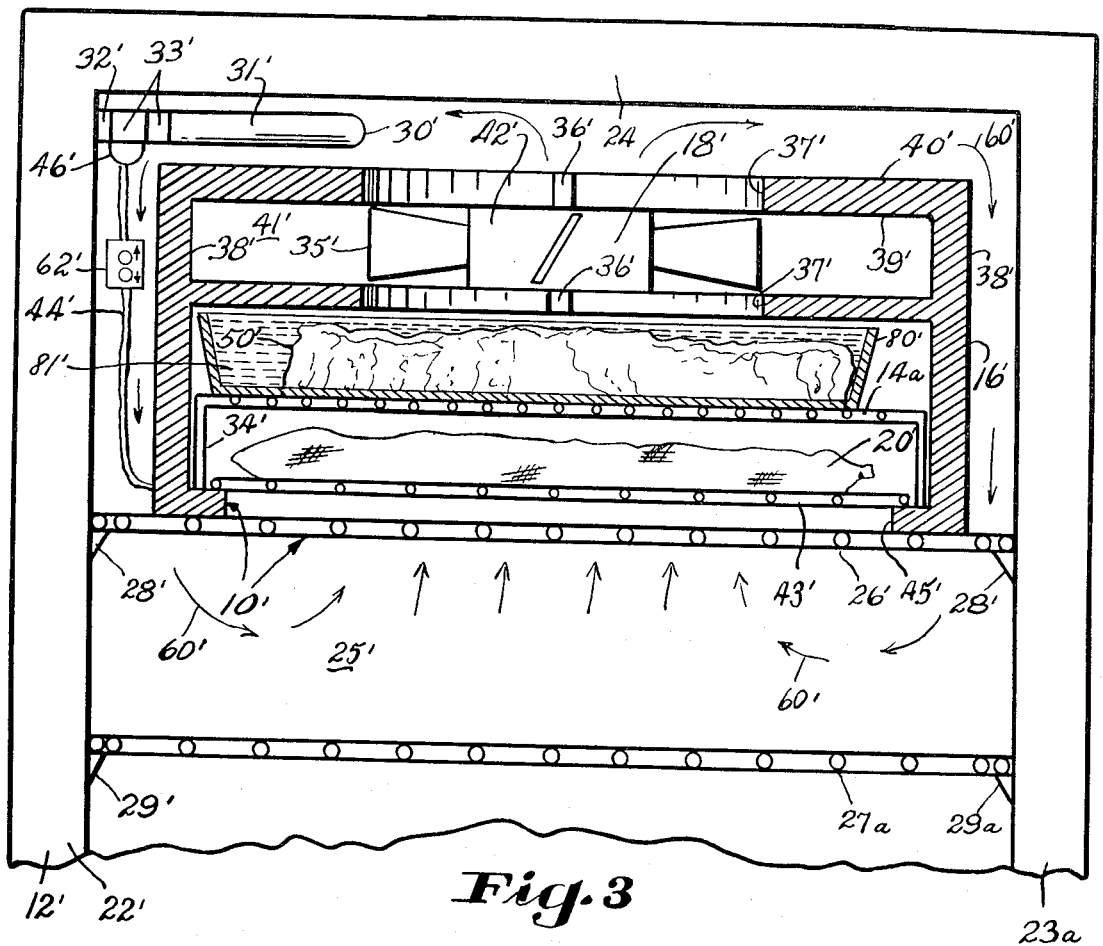
FIG. 3 is a view corresponding to FIG. 1 but showing a modification.
Figure 4:
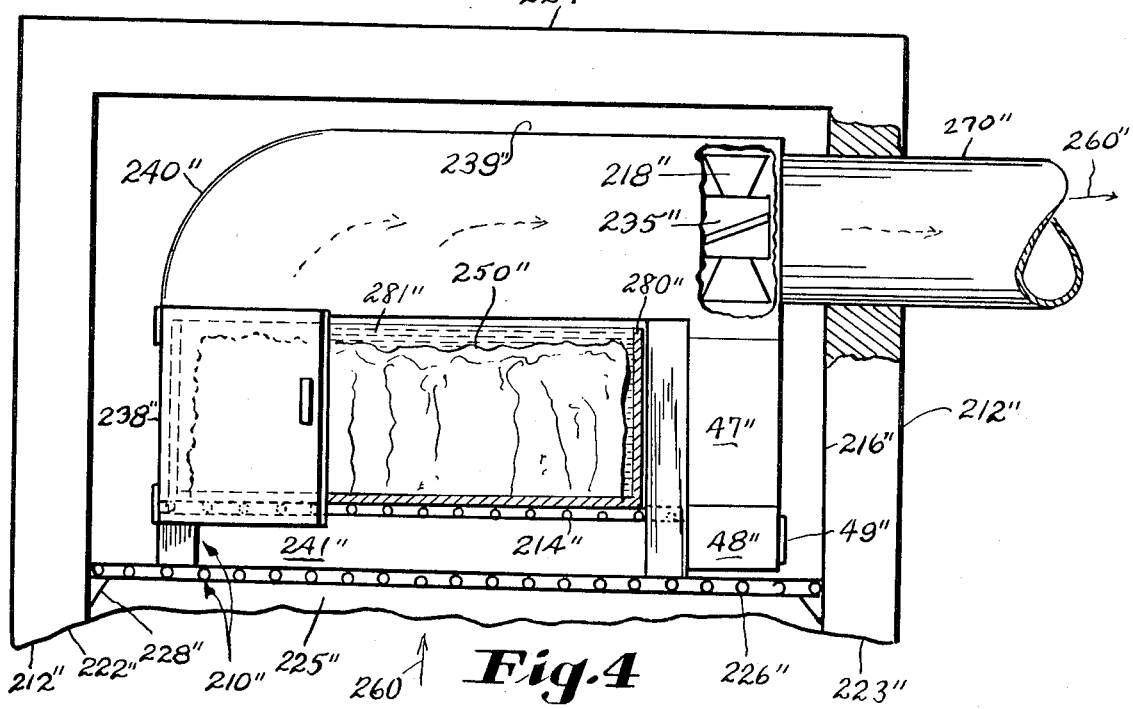
FIG. 4 is a view corresponding to FIG. 2 but showing a modification.

Turning to the modifications shown in FIGS. 3 and 4, for the purpose of avoiding repetition, certain of the parts matching the corresponding first and second embodiments, are given the same reference characters with the addition of the suffixes single prime "'" and double prime "''", respectively.

These modifications are expecially useful in the marination of meats. In order to obtain proper marination of meats in a normal manner, it is usually necessary to immerse the meat in the marinade solution (vinegar and/or wine; oil; and herbs and/or spices) for a period of twelve hours in one position and then to invert the meat and let it stand in the solution for another twelve hour period.

In the modifications 10' and 210'' marinating vessels 80' and 280'' contain the marinade 81' and 281'' and the meat 50' and 250''. The flow 60' and 260'' as it passes over the meat causes a circulation of the marinade and a movement of the spice and herbs in the marinade which increases the effectiveness of the marinating action, and the elapsed time is reduced from twenty four hours to four to six hours.

Greater turbulence of the marinade is obtained when the direction of the air flow for example the air flow 60' is reversed so that it impinges directly on the marinade 81', and for that purpose the electrically driven fan 35' is reversible by means of suitable well known motor ciruitry (not shown) and the reversing switch 62'.

I wish it to be understood that I do not desire to be limited to the exact details of construction shown and described for obvious modifications will occur to a person skilled in the art to which the present invention relates.

I claim:

1. Structure for the simultaneous ageing, defrosting and marinating of meat or the like comprising: a refrigerator, an open vessel containing a marinade, a support for said vessel in said refrigerator, and fan means positioned to direct a current of air upon said open vessel to impinge upon said marinade to cause turbulence in the surface thereof, whereby meat disposed within said vessel is marinated at an accelerated rate.

* * * * *